Figure 1:
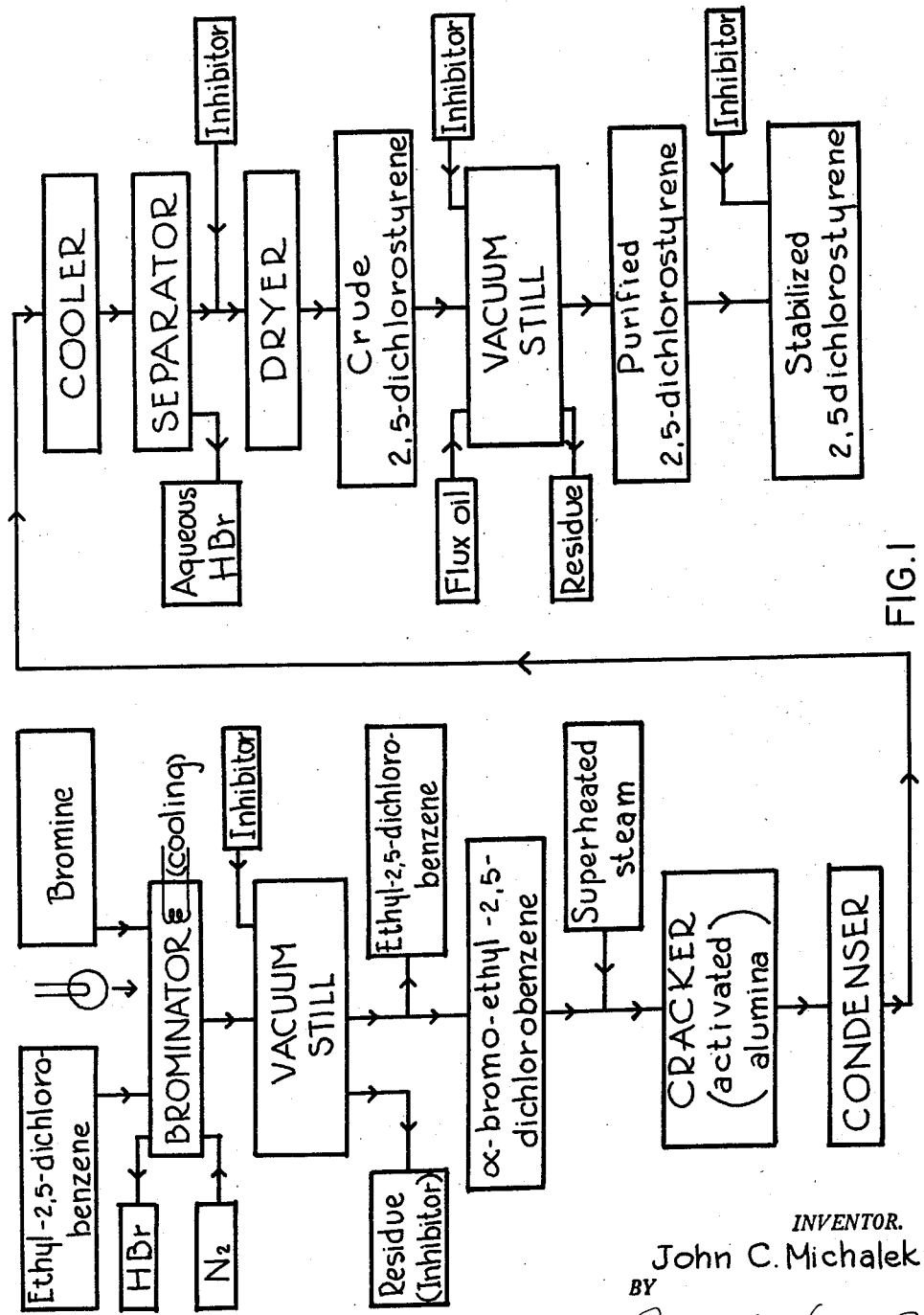
Figure 2:
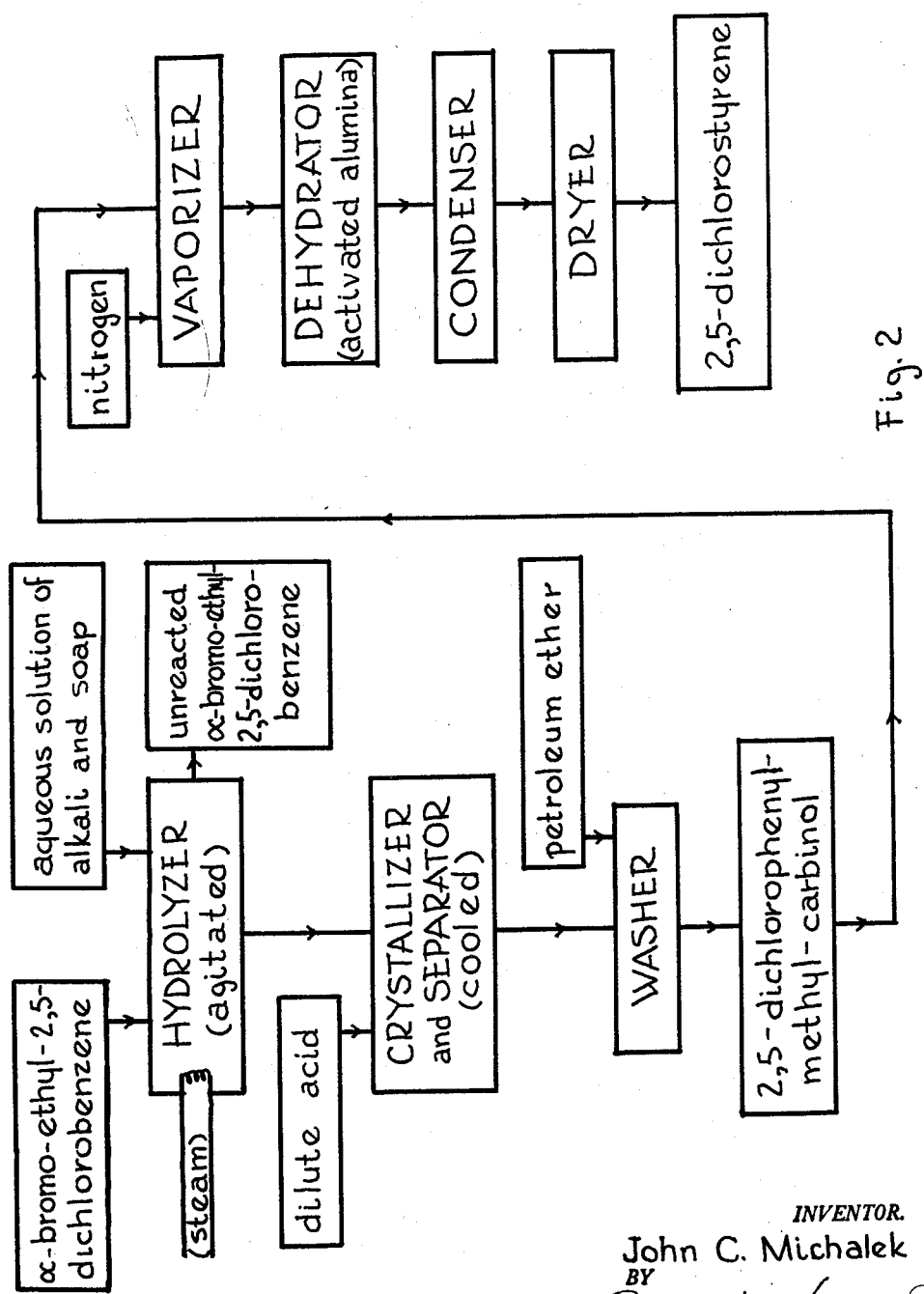

Dec. 8, 1959 — J. C. MICHALEK — 2,916,523
PREPARATION OF 2,5-DICHLORO-ALPHA-BROMO-ETHYLBENZENE AND HYDROLYSIS THEREOF TO 2,5-DICHLOROPHENYL METHYL CARBINOL
Filed May 3, 1954 — 2 Sheets-Sheet 1

INVENTOR.
John C. Michalek

United States Patent Office 2,916,523
Patented Dec. 8, 1959

2,916,523

PREPARATION OF 2,5-DICHLORO-ALPHA-BROMO-ETHYLBENZENE AND HYDROLYSIS THEREOF TO 2,5-DICHLOROPHENYL METHYL CARBINOL

John C. Michalek, Niagara Falls, N.Y.

Application May 3, 1954, Serial No. 427,206

3 Claims. (Cl. 260—618)

The present invention relates to the preparation of 2,5-dichlorostyrene. It is particularly concerned with novel methods of producing 2,5-dichlorostyrene monomer and with novel polymers formed therefrom as well as novel intermediate products useful in the production of the monomer.

In recent years dichlorostyrenes and particularly 2,5-dichlorostyrene have become important since, when polymerized, resinoid materials having desirable electrical properties are obtained. Heretofore no practical, relatively inexpensive method for producing 2,5-dichlorostyrene has been available. It has generally been prepared by processes which, while suitable for the laboratory, are not adapted for large scale manufacture. For example, in one prior process, that is more practical than many others suggested, a mixture of alpha- and beta-chloro-ethyl-2,5-dichlorobenzene is produced which must be separated by distillation. Since at a pressure of 3 mm. of mercury there is only a 9° C. difference in their boiling points, this separation is difficult and, because of the considerable reflux ratio and the large number of theoretical plates in the column necessary for satisfactory operation, the equipment required is large and expensive and the pressure drop is so great that excessive pot temperatures may result.

It is therefore an object of the present invention to provide methods for producing 2,5-dichlorostyrene that are not subject to the disadvantages of the previously known methods.

Another object of the invention is to provide a method for the production of 2,5-dichlorostyrene in a high degree of purity and with a minimum of polymerization loss.

A further object of the invention is to provide a 2,5-dichlorostyrene polymer having novel and desirable properties.

Another object of the invention is to provide a novel, intermediate product from which 2,5-dichlorostyrene can be obtained in good yield.

Still another object of the invention is to provide a novel process for preparing alpha-bromo-ethyl-2,5-dichlorobenzene.

A further object of the invention is to provide processes of the character described which are efficient and comparatively inexpensive to carry out.

Other objects and advantages of the present invention will be apparent from the following description taken in conjunction with the accompanying drawing which sets forth in schematic or flow sheet form a preferred process for preparing 2,5-dichlorostyrene according to the present invention.

The foregoing objects have been achieved by the discovery that by side chain bromination of ethyl-2,5-dichlorobenzene there is produced a novel intermediate compound, alpha-bromo-ethyl-2,5-dichlorobenzene, which is free from beta and dibromo compounds. No difficult, expensive separation is therefore required to obtain the desired product in a high state of purity as is the case with the products obtained by side chain chlorination of ethyl-2,5-dichlorobenzene. The extra cost of the bromine used over the cost of the corresponding amount of chlorine is more than compensated for by the greater facility and economy of operation and the increased yield obtained.

This alpha-bromo-ethyl-2,5-dichlorobenzene may be dehydrobrominated to 2,5-dichlorostyrene without the difficulties and disadvantages of the methods employed in demuriating the corresponding chlorine compound. Alternatively the alpha-bromo-ethyl-2,5-dichlorobenzene may be hydrolyzed under aqueous alkaline conditions to give 2,5-dichlorophenyl-methyl-carbinol which may then be dehydrated to yield 2,5-dichlorostyrene.

In the case of dehydrobromination, since the boiling points of alpha-bromo-ethyl-2,5-dichlorobenzene and the unchanged ethyl-2,5-dichlorobenzene differ by 35° C. at 3 mm. of mercury pressure, a very satisfactory separation may be obtained by distillation. Furthermore, no complication is introduced by both alpha and beta substitution of bromine on the side chain since under the conditions of the reaction no beta-bromo or dibromo side chain substitution products are obtained. Consequently, the purification of the alpha-bromo-ethyl-2,5-dichlorobenzene requires merely a fractionation at reduced pressure for removing the few percent of unconverted ethyl-2,5-dichlorobenzene present. The yield is almost quantitative since about 95% of the ethyl-2,5-dichlorobenzene charged may be recovered as the alpha-bromo substitution product. The cost of the required distillation equipment is of course relatively low because of the large separation of boiling points.

In Example 1 there is described the preparation and recovery of 2,5-dichlorostyrene according to a preferred method of the invention.

EXAMPLE 1

*Step A.—Manufacture of alpha-bromo-ethyl-2,5-dichlorobenzene*

1480 g. of ethyl-2,5-dichlorobenzene (obtained from any suitable and convenient source) was placed in a glass flask provided with a water jacket for cooling. 1322 g. of liquid bromine were added to the flask over a period of 2 hours, the contents of the flask being well agitated and the temperature thereof being maintained between 30° C. and 42° C. Throughout this period the contents of the flask were subjected to illumination by an ordinary tungsten filament flood lamp to induce bromination. At the end of 2 hours the reaction had slowed down to the point where 30 seconds or more were required for 1 drop of bromine to be used up. Feed of bromine to the flask was then discontinued and the hydrogen bromide in the flask was removed by bubbling nitrogen through the contents. The flask was then weighed and it was found that the weight of the contents had increased to 2134 g.

In carrying out the bromination described in the preceding paragraph it is important that the bromine used be dry. The temperature at which the flask contents are kept during feed of the bromine is not particularly critical; while a temperature within the range mentioned is preferred, satisfactory operation may be obtained between about 20° C. and 50° C. Recovery of the hydrogen bromide is important from the cost standpoint. It is preferred to remove it in the manner described but other known methods for accomplishing this may be used. If desired, it could even be removed during the distillation described in the following step. However, this is not preferred since it would require the use of acid resistant materials therefor.

Step B.—Separation of alpha-bromo-ethyl-2,5-dichlorobenzene

The crude alpha-bromo-ethyl-2,5-dichlorobenzene obtained from step A, above, was transferred to a still for purification. The still was provided with a column approximately ¾ in. in inside diameter having protruded Type 316 stainless steel packing and comprising approximately 25 theoretical plates. As an inhibitor to prevent dehydrobromination, 0.2% of alpha-(3-aminophenylnitrilo)-o-cresol was added to the still contents. Distillation was carried out at about 5–6 mm. of mercury pressure. Using a reflux ratio of 8:1 there was first obtained a distillate consisting of 45.5 g. of unchanged ethyl-2,5-dichlorobenzene. Then, with the reflux ratio reduced to 3:1, 2037.5 g. (8.02 mols) of alpha-bromo-ethyl-2,5-dichlorobenzene free of inhibitor, was recovered as an overhead product. This amount is 97.9+% of theoretical (8.45 mols of ethyl-2,5-dichlorobenzene charged minus 0.26 mol recovered unchanged=8.19 mols, the theoretical yield). The high recovery and the fact that there was no change in the index of refraction of the product or its boiling point during the distillation indicates that neither beta-bromo-ethyl-2,5-dichlorobenzene nor dibromo-ethyl-2,5-dichlorobenzene were formed to any appreciable extent. The alpha-bromo-ethyl-2,5-dichlorobenzene obtained was a water-white liquid having the following properties: Freezing point—24° C.–25° C., boiling point (5 mm.)—118° C., $N_D^{25}$—1.5878, $D_4^{20}$—1.572. It has a musty odor, possesses lachrymatory properties, and is quite stable at room temperatures. When stored in glass bottles no evolution of hydrogen bromide has been observed after standing several weeks, even in the absence of an inhibitor.

Dehydrobromination during the separation step described above is very undesirable as polymerization of the dichlorostyrene formed will, in addition to causing loss of material, cause an unduly high viscosity in the still pot. It is therefore preferred to operate at a low pressure to permit distillation at a relatively low temperature. It is also highly desirable to use an inhibitor, especially when metal is present in the system. Although alpha-(3-amino-phenylnitrilo)-o-cresol is preferred as an inhibitor other inhibitors known in the art such as alpha-nitroso-beta-naphthol or diphenylamine may be used if desired. Protruded stainless steel packing has been found very efficient in operation. Protruded packing of other metals, such as nickel, Monel or other stainless steels, is likewise satisfactory. Tower packing materials such as glass and porcelain may also be used, though they are considerably less efficient and satisfactory.

Step C.—Dehydrobromination of alpha-bromo-ethyl-2,5-dichlorobenzene

A column of commercial activated alumina approximately 24 in. long in a 2¼ in. heat-resistant glass tube was employed for dehydrobromination of the pure alpha-bromo-ethyl-2,5-dichlorobenzene obtained from step B. Steam, separately generated and superheated, was passed into the alumina column at a temperature of from 290° C. to 310° C. 1952 g. of alpha-bromo-ethyl-2,5-dichlorobenzene were fed into the steam stream at such a rate that 3½ hours were required to pass the total charge through the column. About 9 kg. of steam were used per kilogram of compound fed. The vapors from the column were led through a water cooled condenser and were finally cooled by cracked ice. The condensed 2,5-chlorostyrene, after separation from the aqueous condensate, was washed to remove hydrobromic acid and a small percentage of diamyl hydroquinone was added thereto to inhibit polymerization. It was then dried by contact with a mass of granular potassium carbonate. On weighing, it was found that 1239 g. of crude 2,5-dichlorostyrene were obtained. This corresponds to a recovery of 93.5% based on the alpha-bromo-ethyl-2,5-dichlorobenzene fed to the column.

In the dehydrobromination step described in the preceding paragraph other vapor-phase catalysts, such as silica gel or alumina impregnated with suitable metal phosphates or silicates, may, if desired, be employed in place of activated alumina. The temperature of the steam is not particularly critical. It is superheated in order to furnish heat for vaporization and cracking of the alpha-bromo-ethyl-2,5-dichlorobenzene. A temperature of about 300° C. is convenient but temperatures within the range from about 250° C. to about 350° C. may be used. Other carriers for the alpha-bromo-ethyl-2,5-dichlorobenzene such as nitrogen or other inert gas may be used instead of superheated steam. The use of the latter is preferred, however, because of the facility with which the large quantity of heat necessary for the endothermic dehydrobromination reaction may be supplied thereby.

Washing of the 2,5-dichlorostyrene may be omitted if desired and the product may merely be separated from the aqueous layer and passed to the dryer after addition of inhibitor.

Drying of the 2,5-dichlorostyrene produced may be carried out with any convenient inert, solid dehydrating agent. The addition of an inhibitor to the dichlorostyrene product is important. Other well-known inhibitors such, for example, as substituted catechols or hydroquinone may be used in place of the diamyl hydroquinone. The activated alumina catalyst gradually becomes inefficient as a result of the deposit therein of carbon, tar and other decomposition products. It is therefore necessary to substitute fresh catalyst or reactivate the used catalyst when the conversion drops below a reasonable level. Reactivation may be carried out in any suitable known manner.

Step D.—Purification of 2,5-dichlorostyrene

Crude 2,5-dichlorostyrene obtained from step C was purified by semi-continuous vacuum distillation carried out in a laboratory still using a 500 ml. glass flask as a still pot and with a fractionating column of about 25 theoretical plates. Distillation was started with the still pot containing a mixture of 50 ml. of crude 2,5-dichlorostyrene, 64 g. of partially hydrogenated terphenyl as a flux oil, 3 g. of diamyl hydroquinone and 3 g. of ditertiarybutyl catechol. The two latter-mentioned materials were added to inhibit polymerization of the 2,5-dichlorostyrene during heating. The flask was provided with a ground glass connection to a reservoir provided with a stopcock through which small portions of the crude dichlorostyrene were added to the still at intervals in order to maintain a substantially constant amount of material therein. Three grams of the inhibitor mixture were also added to the crude material in the reservoir to insure the introduction of inhibited material into the system.

Distillation was carried out at a pressure of 3.2 mm. of mercury and the column was allowed to reflux for 15 minutes before withdrawing any material, thus causing it to come approximately to equilibrium. Thereafter, product was removed overhead at a 3:1 reflux ratio and additional crude material was admitted to the still from the reservoir at such a rate that the net content of dichlorostyrene in the still remained in the range of 40 to 60 ml. About 5 hours was required to pass the full charge of 1239 ml. of crude 2,5-dichlorostyrene through the still. During this time the temperature at the still head and the refractive index of the product remained substantially constant. There was recovered 1177.5 g. of purified 2,5-dichlorostyrene having a boiling point of 77.0° C.–77.7° C. at 3.2 mm. pressure and an index of refraction at 25° C. of 1.5784–1.5787. The recovery of purified 2,5-dichlorostyrene was, therefore, 95% of the crude charged. The purified product may be stabilized to prevent polymerization during storage with diamyl hydroquinone or other suitable inhibitor.

A large number of inhibitors for use with dichlorostyrene have been disclosed in the prior art. Some of these, such as diamyl hydroquinone, are relatively non-volatile and will protect the monomers against polymerization in a still pot or in storage. Others, like monotertiarybutyl catechol, are volatile enough to go up the column during distillation and protect the monomer there. It will be obvious that any desired combination of suitable inhibitors may be used and that, depending on their solubility, volatility, etc. they may be introduced into the system wherever required or convenient.

The production of 2,5-dichlorostyrene by the process described above has many advantages. These, as previously mentioned, more than compensate for the additional cost entailed by the use of bromine instead of chlorine for halogenation of the side chain of ethyl-2,5-dichlorobenzene. Perhaps the most important advantage is the fact, verified by a number of tests, that under the conditions of the reaction neither beta-bromo-ethyl-2,5-dichlorobenzene nor dibromo-ethyl-2,5-dichlorobenzene is produced in significant amount. In some of such tests a still containing brominated ethyl-2,5-dichlorobenzene has been run until dry without any material change in the boiling point of the still contents and with no material variation in the index of refraction of the distilled product. This, and the remarkable stability of alpha-bromo-ethyl-2,5-dichlorobenzene are surprising since in experiments with side chain bromination of ethyl-3,4-dichlorobenzene it was found that the bromination readily went beyond the production of mono-brominated products and that the alpha-bromo compound was so unstable that it could not be distilled with any inhibitor available without decomposition.

As a consequence of the fact that only alpha-bromo-ethyl-2,5-dichlorobenzene is produced when the side chain of ethyl-2,5-dichlorobenzene is brominated and as a result of the stability of alpha-bromo-ethyl-2,5-dichlorobenzene, the separation of the brominated product from the small amount of unbrominated product is easily carried out. Furthermore, since only one brominated product is formed, the yield of that product is much greater than would be obtained if a number of such products were formed. Indeed, as shown above, about 95% of the ethyl-2,5-dichlorobenzene charged to the bromination apparatus may be recovered as alpha-bromo-ethyl-2,5-dichlorobenzene without recycling.

The overall yield of the process described in Example 1 is also very satisfactory. In that example the amount of pure 2,5-dichlorostyrene obtained is 87% of the theoretical based on the amount of ethyl-2,5-dichlorobenzene originally charged to the brominator. This is exclusive of the amount of product which might be obtained by recycling of unconverted products in any of the steps.

In the procedure set forth in step A of Example 1 no mention is made of a brominating catalyst and none was used. When subjected to light containing a substantial amount of radiation of higher energy level than the bromine absorption bands, such as a common incandescent flood lamp, alpha bromination of the side chain of ethyl-2,5-dichlorobenzene proceeded without difficulty after a short induction period. This period in various tests was as short as about 30 seconds and in a few cases as long as about 30 minutes. It may happen occasionally that a particular lot of ethyl-2,5-dichlorobenzene is characterized by having a very long induction period at the end of which evolution of hydrogen bromide takes place with undesirable rapidity. In such cases, or, if desired in other cases, phosphorous trichloride, phosphorous tribromide or other suitable bromination catalyst may be employed.

In step B of Example 1 there is described the separation of pure alpha-bromo-ethyl-2,5-dichlorobenzene from unchanged ethyl-2,5-dichlorobenzene by distillation. It has been found that a substantially pure product may also be obtained by crystallization of the brominated compound from the liquid crude product. This is described in the following example.

EXAMPLE 2

A mass of the crude product resulting from step A of Example 1 is placed in a vessel cooled to 10° C.–15° C. and seeded with crystals of alpha-bromo-ethyl-2,5-dichlorobenzene. Crystallization throughout the batch results quickly. The alpha-bromo-ethyl-2,5-dichlorobenzene crystallizes in very large, compact, hexagonal crystals which occlude practically no mother liquor. Consequently, the latter may be readily drained from the mass of crystals obtained. After separation of the crystals from the mother liquor the crystals are melted and crystallization is repeated. It is generally found on the third recrystallization that there is very little mother liquor remaining with the crystalline mass. The crystalline product is substantially pure alpha-bromo-ethyl-2,5-dichlorobenzene, its freezing point being from 24.5° C. to 25° C. The mother liquor obtained in the crystallization steps may, of course be combined and rebrominated so that no ethyl-2,5-dichlorobenzene is wasted.

Since the crystalline mass of alpha-bromo-ethyl-2,5-dichlorobenzene formed in the vessel is very dense and the crystals essentially fill the space occupied by the batch, it is desirable to use a metal vessel, for example one of stainless steel, or a round-bottom glass flask filled less than half full to avoid breaking of the crystallization vessel by expansion of the mass when it is melted for recrystallization.

The 2,5-dichlorostyrene obtained by dehydrobromination of alpha-bromo-ethyl-2,5-dichlorobenzene may, instead of being purified by distillation as described in step D of Example 1, be purified by recrystallization. This is illustrated in the following example.

EXAMPLE 3

Crude 2,5-dichlorostyrene obtained after separation from the aqueous phase and drying as described in step C of Example 1 was cooled to a temperature of from 0 to 4° C. and seeded with crystals of 2,5-dichlorostyrene. Growth of the crystals was rapid and after several hours the crystallization was substantially complete. The mother liquor was drained from the crystals at a temperature of from 80° C.–8.5° C. The crystals obtained were melted and recrystallized in the same manner. This procedure was repeated twice after which it was found that the freezing point of the crystals was 8.5° C., showing their substantial purity.

In Example 1 there is set forth a preferred method of preparing 2,5-dichlorostyrene starting with ethyl-2,5-dichlorobenzene and involving the bromination of the side chain of the latter followed by dehydrobromination. It has been discovered that the alpha-bromo-ethyl-2,5-dichlorobenzene produced in carrying out this process may be readily hydrolyzed to convert it into 2,5-dichlorophenyl-methyl-carbinol which may then be dehydrated to form 2,5-dichlorostyrene. In the following example details of the preparation of 2,5-dichlorostyrene according to this procedure are set forth.

EXAMPLE 4

Step A.—Hydrolysis of alpha-bromo-ethyl-2,5-dichlorobenzene 788 g. of alpha-bromo-ethyl-2,5-dichlorobenzene were mixed with 1300 ml. of water containing in solution a few grams of potassium stearate and 205 g. of potassium hydroxide. This mixture was heated to the boiling point of the solution and mechanically agitated. More of the soap was gradually added, care being taken to prevent excessive foaming, until a total of 37 g. was reached. After 24 hours the analysis of the bromide content of the aqueous layer showed that approximately 99% of the original brominated compound had been hydrolyzed. The material in the reaction vessel easily volatile with steam, which was substantially only the unhydrolyzed alpha-bromo-ethyl-2,5-dichlorobenzene, was then steamed out and condensed, the water of the condensate being returned to the vessel. There were thus left in the vessel the 2,5-dichlorophenyl-methlyl-carbinol product together with the soap, excess potassium hydroxide, the potassium bromide formed, and water. The alkali residue and soap were neutralized with dilute sulfuric acid to facilitate separation of the flask contents into an aqueous layer and a non-aqueous layer.

Other alkalies such as sodium hydroxide, for example, and other water soluble soaps, for example sodium or potassium oleate or laurate may be used in place of the ones mentioned. When the hydrolysis is carried out in a large vessel foam production will be less of a problem and all of the soap used may then be added at once. The amount of soap employed may vary rather widely. In general, however, only enough should be used to cause the reaction to proceed with good speed since an excess results in excessive foaming. By carrying out the hydrolysis in a closed system pressures higher than atmospheric pressure can be employed and the temperature of the solution may be raised. This will result in an increase in the speed of the reaction.

The carbinol and stearic acid layer was separated from the aqueous layer and the former was purified in the manner described below.

*Step B.—Separation and purification of 2,5-dichlorophenylmethyl-carbinol*

The carbinol and stearic acid, which were insoluble in the aqueous layer resulting from neutralization, as described in step A above, were separated from the aqueous contents of the vessel and from each other by crystallization. The temperature of the mixture was reduced to about 10° C. to hasten such crystallization. After crystallization occurred the aqueous layer was drained and replaced by 100 ml. of petroleum ether. The temperature of the mixture was raised to about 60° C. to assist the solution of the stearic acid and carbinol in the petroleum ether. The temperature was then again reduced to 10° C. thus causing crystallization of the carbinol while the stearic acid remained in solution. The petroleum ether solution of stearic acid was drained off and the carbinol was thrice recrystallized in substantially the same manner from 100 ml. additions of petroleum ether. After this the carbinol crystals were washed with petroleum ether and drained. 460 g. of carbinol resulted. Thirty-two additional grams were subsequently recovered from the petroleum ether used in crystallization and washing, by evaporation and recrystallization therefrom, thus making a total recovery of 492 g. or 83% of the theoretical yield. The purified carbinol was a white solid having a freezing point of 62.8° C.

In carrying out the crystallization described above other solvents, preferably non-water-miscible, such, for example, as benzene, may be used instead of petroleum ether. Also, the temperatures mentioned above are not critical and any convenient temperatures may be employed. Thus, for example, the temperature used for crystallization should be above 0° C. to avoid difficulty from the freezing of moisture present but it may be as high as 20°–25° C. The carbinol readily dissolves in the petroleum ether at 50° C.–60° C. so that there is no necessity for higher temperatures. Although the separation and purification of the carbinol by crystallization is quite satisfactory and preferred it will be understood that if desired distillation may be employed to obtain it in purified condition.

Production of 2,5-dichlorostyrene from the carbinol product obtained in the foregoing step is described below.

*Step C.—Dehydration of 2,5-dichlorophenyl-methyl-carbinol*

The 2,5-dichlorophenyl-methyl-carbinol is vaporized in a stream of nitrogen by feeding it continuously into an inclined vaporizing tube, which may conveniently be made of glass, that is heated externally about 300° C. to 350° C. From the vaporizing tube the carbinol vapor and nitrogen are passed through a tube of larger diameter packed with granules of activated alumina and maintained at a temperature of from about 300° C. to about 350° C. by a furnace or other suitable means. The temperature of the vaporizing tube is controlled so that the carbinol feed is completely vaporized before reaching the catalyst. The flow of the nitrogen and the rate at which the carbinol is fed into the vaporizing tube are so adjusted that after vaporization the partial pressure of carbinol vapor in the tube is of the order of 10 to 20 mm. of mercury. The vapors coming from the alumina-filled tube are passed through a condenser and a mixture of water and 2,5-dichlorostyrene is collected.

The 2,5-dichlorostyrene obtained by separation from the water resulting from the dehydration described above is quite pure after drying. If care is taken to change the activated alumina catalyst before it is excessively fouled or carbonized, the conversion of the carbinol to dichlorostyrene is substantially complete. If a high degree of purity is desired, the 2,5-dichlorostyrene may be purified by fractional distillation under vacuum. Any unconverted carbinol will remain in the bottoms and thus be removed.

Since alpha-bromo-ethyl-2,5-dichlorobenzene has slight lachrymatory properties and is unpleasant to handle it is often desirable to reduce the manipulation thereof as much as possible. It has been found that the hydrolysis required to produce 2,5-dichlorophenyl-methyl-carbinol therefrom may be effectively carried out even on the crude brominated compound without the necessity of separating the few percent of unbrominated ethyl-2,5-dichlorobenzene present. Such an operation is described in the following example.

EXAMPLE 5

787 g. of crude alpha-bromo-ethyl-2,5-dichlorobenzene obtained from the process of step A of Example 1 were mixed in a flask with 140 g. of sodium hydroxide and 40 g. of ordinary cake soap ("Ivory") dissolved in 1250 ml. of distilled water. The mixture was vigorously agitated for 25 hours while maintaining it at the atmospheric boiling point of the solution. The hydrolysis reaction was then substantially complete and the volatile products including the 3–5% of unconverted ethyl-2,5-dichlorobenzene were steamed off as described above in step B of Example 4. This was followed by crystallization of the carbinol using petroleum ether without neutralization of the sodium hydroxide or soap. In two recrystallizations, and without reworking the petroleum ether fraction, 66% of the theoretical yield substantially pure 2,5-di-chlorophenyl-methyl-carbinol was obtained. The crystals of the product had a freezing point of 62.8° C., showing absence of substantial amounts of impurities.

The carbinol produced by the process of Example 5 may be dehydrated as previously described to form 2,5-dichlorostyrene. The 2,5-dichlorostyrene obtained from Example 5 as well as from step C of Example 4 may be purified if necessary or desired in any convenient way, as, for example, by distillation, crystallization or solvent extraction according to the procedures described above or any other suitable methods.

It will be understood that in carrying out any of the processes herein described conventional or other known practices may be followed where necessary or desirable and that failure to mention such practices in any case is not to be interpreted as an exclusion thereof. For example, unreacted materials in any or all of the steps of the processes set forth may be, and desirably are, recovered and/or recycled. As another example, the hydrogen bromide and any other bromides obtained are collected for recovery of the bromine content.

2,5-dichlorostyrene obtained by following any of the processes described herein may be polymerized in accordance with conventional practice to obtain polymers having desirable properties. Such polymers have the particular advantage over other dichlorostyrene polymers that they are very resistant to the occurrence of scattered internal flecks or the formation of spicules. Such flecks are characteristic of the dichlorostyrene polymers previously known and rapidly appear or develop when the polymer is exposed to even a relatively small amount of water vapor. Even ordinary atmospheric moisture results in their formation or development. These flecks adversely affect the electrical properties of the polymers and, in some cases, certain of their physical properties also.

In the following example there is shown the remarkable and novel resistance of 2,5-dichlorostyrene polymer, formed from monomer produced in accordance with the present invention, to the formation of such flecks.

EXAMPLE 6

Monomeric 2,5-dichlorostyrene produced by following Example 1 was passed through activated alumina to remove the inhibitor. Benzoyl peroxide in the amount of 0.1% was added to the inhibitor-free monomer and the mixture was heated for 16 hours at 60° C. and then for 4 additional hours at 135° C. These temperatures and times are representative of conditions used conventionally for the polymerization of dichlorostyrenes. The resultant polymer sample showed no flecks or spicules during exposure to ordinary indoor conditions for over 9 months, even during the humid season when humidities of 80% to 95% are not uncommon. After this, the sample was placed in air saturated with water vapor at ordinary room temperature. After 52 days in this atmosphere spicules did appear but to a considerably lesser extent than the usual dichlorostyrene polymers exhibit after only 3 days' exposure to such an atmosphere.

Similar results are obtainable with products resulting from the polymerization of 2,5-dichlorostyrene produced by the other processes described herein.

In the foregoing description and the appended claims the phrase "brominated compound" is sometimes used for convenience in referring to alpha-bromo-ethyl-2,5-dichlorobenzene.

It will be understood that the processes disclosed in the foregoing description are subject to considerable variation in accordance with known practices and procedures and that the apparatus described may be modified and varied as required by conditions including the scale of operation, facilities available and the like, all without departure from the essence and spirit of the present invention.

I claim:

1. A process for preparing alpha-bromo-ethyl-2,5-dichlorobenzene substantially free from beta-substituted bromo compounds and di-substituted bromo compounds by treatment of ethyl-2,5-dichlorobenzene with dry bromine in the absence of solvents.

2. A process for preparing 2,5-dichlorophenyl-methylcarbinol which comprises hydrolyzing alpha-bromo-ethyl-2,5-dichlorobenzene in an aqueous medium in the presence of an alkali and a water-soluble soap.

3. A process as set forth in claim 2 in which the carbinol is separated from said aqueous medium and is purified by crystallization from a water-immiscible solvent.

References Cited in the file of this patent

UNITED STATES PATENTS

| | | |
|---|---|---|
| 2,046,319 | Brooks | Aug. 27, 1946 |
| 2,449,877 | Carswell | Sept. 21, 1948 |
| 2,463,897 | Michalek | Mar. 8, 1949 |
| 2,507,506 | Dreisbach et al. | May 16, 1950 |
| 2,519,125 | Erickson | Aug. 15, 1950 |
| 2,528,445 | Markarian | Oct. 31, 1950 |
| 2,602,823 | Ross et al. | July 8, 1952 |
| 2,659,760 | Frevel | Nov. 17, 1953 |
| 2,695,900 | Markarian et al. | Nov. 30, 1954 |